US012358148B2

(12) United States Patent
Oba et al.

(10) Patent No.: US 12,358,148 B2
(45) Date of Patent: Jul. 15, 2025

(54) ROBOT-MOUNTED MOVING DEVICE, SYSTEM, AND MACHINE TOOL

(71) Applicants: DMG MORI CO., LTD., Nara (JP); Skylla Technologies, Lexington, MA (US)

(72) Inventors: Yuta Oba, Nara (JP); Tsutomu Sakurai, Hokkaido (JP); Hideki Nagasue, Nara (JP); Masaaki Nakagawa, Nara (JP); Kota Weaver, Lexington, MA (US); Anand Parwal, Lexington, MA (US)

(73) Assignees: DMG MORI CO., LTD., Nara (JP); Skylla Technologies, Lexington, MA (US)

( * ) Notice: Subject to any disclaimer, the term of this patent is extended or adjusted under 35 U.S.C. 154(b) by 402 days.

(21) Appl. No.: 17/642,573

(22) PCT Filed: Sep. 10, 2020

(86) PCT No.: PCT/US2020/050073
§ 371 (c)(1),
(2) Date: Mar. 11, 2022

(87) PCT Pub. No.: WO2021/050646
PCT Pub. Date: Mar. 18, 2021

(65) Prior Publication Data
US 2022/0331970 A1 Oct. 20, 2022

Related U.S. Application Data

(63) Continuation-in-part of application No. PCT/US2019/050641, filed on Sep. 11, 2019, which
(Continued)

(51) Int. Cl.
| B25J 9/16 | (2006.01) |
| B25J 11/00 | (2006.01) |
| G05B 19/402 | (2006.01) |

(52) U.S. Cl.
CPC ............. *B25J 9/1697* (2013.01); *B25J 9/163* (2013.01); *B25J 9/1641* (2013.01); *B25J 9/1692* (2013.01);
(Continued)

(58) Field of Classification Search
CPC ........ B25J 9/1697; B25J 9/163; B25J 9/1641; B25J 9/1692; B25J 11/005; B25J 9/162;
(Continued)

(56) References Cited

U.S. PATENT DOCUMENTS 10,737,387 B2 * 8/2020 Du ........................ B25J 9/1694
2016/0303739 A1 * 10/2016 Apkarian .............. H04L 67/303
(Continued)

FOREIGN PATENT DOCUMENTS

| EP | 4019200 A1 | 6/2022 |
| JP | H11156764 A | 6/1999 |

(Continued)

OTHER PUBLICATIONS

Notification for Reasons for Rejection for related Application No. 2021-526426; report dated Jul. 12, 2022.
(Continued)

*Primary Examiner* — Sohana Tanju Khayer
(74) *Attorney, Agent, or Firm* — von Briesen & Roper, s.c.

(57) ABSTRACT

A system includes a machine tool 10, a robot 25 having a camera 31, and a transfer device 35 having the robot 25 mounted thereon, and an identification figure is arranged in a machining area of the machine tool 10.

11 Claims, 8 Drawing Sheets

Related U.S. Application Data is a continuation-in-part of application No. PCT/IB2019/001004, filed on Sep. 11, 2019.

(52) U.S. Cl.
CPC .............. *B25J 11/005* (2013.01); *B25J 9/162* (2013.01); *G05B 19/402* (2013.01); *G05B 2219/39045* (2013.01); *G05B 2219/40298* (2013.01); *G05B 2219/40613* (2013.01)

(58) Field of Classification Search
CPC ........ G05B 19/402; G05B 2219/39045; G05B 2219/40298; G05B 2219/40613; G05B 2219/50362
See application file for complete search history.

(56) References Cited

U.S. PATENT DOCUMENTS

| | | | | |
|---|---|---|---|---|
| 2017/0095930 | A1* | 4/2017 | Warashina | B25J 9/1697 |
| 2018/0093380 | A1* | 4/2018 | Yoshida | B25J 13/088 |
| 2019/0184570 | A1* | 6/2019 | Yung | B25J 9/163 |
| 2019/0246858 | A1* | 8/2019 | Karasikov | A47L 9/2894 |
| 2020/0316780 | A1* | 10/2020 | Rostrup | B25J 9/1692 |

FOREIGN PATENT DOCUMENTS

| | | |
|---|---|---|
| JP | 2018058142 A | 4/2018 |
| WO | 2019095045 A1 | 5/2019 |

OTHER PUBLICATIONS

International Search Report for related Application No. PCT/US2020/050073; report dated Nov. 30, 2020.

Extended European Search Report related to Application No. 20864229.8; reported on Dec. 19, 2023.

Japanese Notification for Reasons for Rejection for related Application No. 2021-526426; report dated Feb. 28, 2023.

* cited by examiner

ROBOT-MOUNTED MOVING DEVICE, SYSTEM, AND MACHINE TOOL

TECHNICAL FIELD

The present disclosure relates to a machine tool machining a workpiece, a robot performing an operation to the machine tool, a moving device having the robot mounted thereon and configured to be movable to an operating position set with respect to the machine tool, and a system including these elements.

BACKGROUND ART

A known example of a system as mentioned above is disclosed in Japanese Unexamined Patent Application Publication No. 2017-132002. This system is configured such that an automatic guided vehicle having a robot mounted thereon moves to an operating position set with respect to a machine tool, and the robot performs operations, such as attachment and removal of a workpiece, to the machine tool at the operating position.

Such a system enables a single robot which is moved by an automatic guided vehicle to perform operations, such as attachment and removal of a workpiece, to more than one machine tool. Therefore, as compared with a system in which a robot is arranged in a fixed manner with respect to a machine tool, the degree of freedom in machine tool layout is increased so that a machine tool layout which provides enhanced production efficiency is possible. Further, since it is possible to cause a single robot to perform operations to many machine tools, equipment costs are reduced as compared with the conventional system in which the robot is arranged in a fixed manner.

However, because the automatic guided vehicle is configured to move itself by means of wheels, the automatic guided vehicle cannot always be stopped at the operating position with high positioning accuracy. Therefore, in order that the robot accurately performs operations to the machine tool, it is necessary to, when the automatic guided vehicle is positioned at the operating position, compare the pose of the robot with a reference pose of the robot, which is set in so-called teaching and serves as a reference for control, detect an amount of error between them, and compensate an operating pose of the robot based on the detected amount of error.

A known technique for such robot-pose compensation is disclosed as a position compensation method in Japanese Unexamined Patent Application Publication No. 2016-221622. Specifically, this position compensation method is configured such that a visual target consisting of two calibration markers is arranged on an outer surface of the machine tool, images of the visual target are captured by a camera arranged on a movable part of the robot, a relative positional relation between the robot and the machine tool is measured based on the captured images and the position and pose of the camera, and an operating pose of the robot is compensated based on the measured positional relation.

However, in the above-described conventional position compensation method, for example, when a hand or the like of the robot is inserted into the machine tool to cause the hand to attach or remove a workpiece to or from a chuck or the like of the machine tool, the pose of the robot for performing the attachment or removal is not accurately compensated.

Specifically, because the automatic guided vehicle is configured to be moved by operation of the wheels that have a relatively high degree of freedom, the automatic guided vehicle has the characteristics that the robot mounted surface is easily tilted toward the floor and that the tilt of the robot mounted surface easily varies due to change of the pose of the robot mounted thereon, in other words, due to change of the position of the center of gravity of the robot.

Therefore, when the robot is in a pose having the hand thereof inserted in the machine tool to attach or remove a workpiece, in other words, when an arm of the robot is overhanging to a great extent from the automatic guided vehicle, the tilt of the robot mounted surface is greater than that when the hand of the robot is positioned outside the machine tool and the arm is not overhanging from the automatic guided vehicle or is overhanging only to a very slight extent.

Therefore, where, as in the above-described conventional position compensation method, a visual target as a calibration marker is arranged on an outer surface of the machine tool and an amount of position compensation (amount of pose compensation) for the robot is obtained with the robot positioned outside the machine tool, the pose of the robot for attachment or removal of a workpiece that is performed with the hand of the robot positioned inside the machine tool cannot be accurately compensated based on the obtained amount of position compensation.

Further, where the pose of the robot for attachment or removal of a workpiece is inaccurately compensated, the hand of the robot is inaccurately positioned with respect to the chuck. For example, in the case where the chuck is such that its clamping part has a very slight movement allowance (stroke), i.e., it has a very slight clearance with respect to a workpiece to be clamped, such as a collet chuck, the chuck may fail to reliably clamp the workpiece.

Further, where attachment or removal of a workpiece is not reliably carried out, availability of the system is reduced. Such a system cannot achieve an unmanned system with excellent production efficiency.

Furthermore, the position compensation method disclosed in Japanese Unexamined Patent Application Publication No. 2016-221622 is configured to cause the camera to capture images of the two calibration markers individually; therefore, the robot needs a long operating time to capture the images of the calibration markers, which reduces production efficiency of the system.

SUMMARY OF THE INVENTION

In view of these circumstances, the present disclosure provides a system, a moving device, and a machine tool as set forth in the attended claims.

According to the present disclosure, the pose of the robot is compensated by the use of an identification figure arranged in the machine tool where the robot actually operates; therefore, the pose of the robot is accurately compensated. This enables the robot to accurately carry out even an operation which requires high operating accuracy.

DETAILED DESCRIPTION

Hereinafter, specific embodiments of the present invention will be described with reference to the drawings.

First Embodiment

Figure 1:
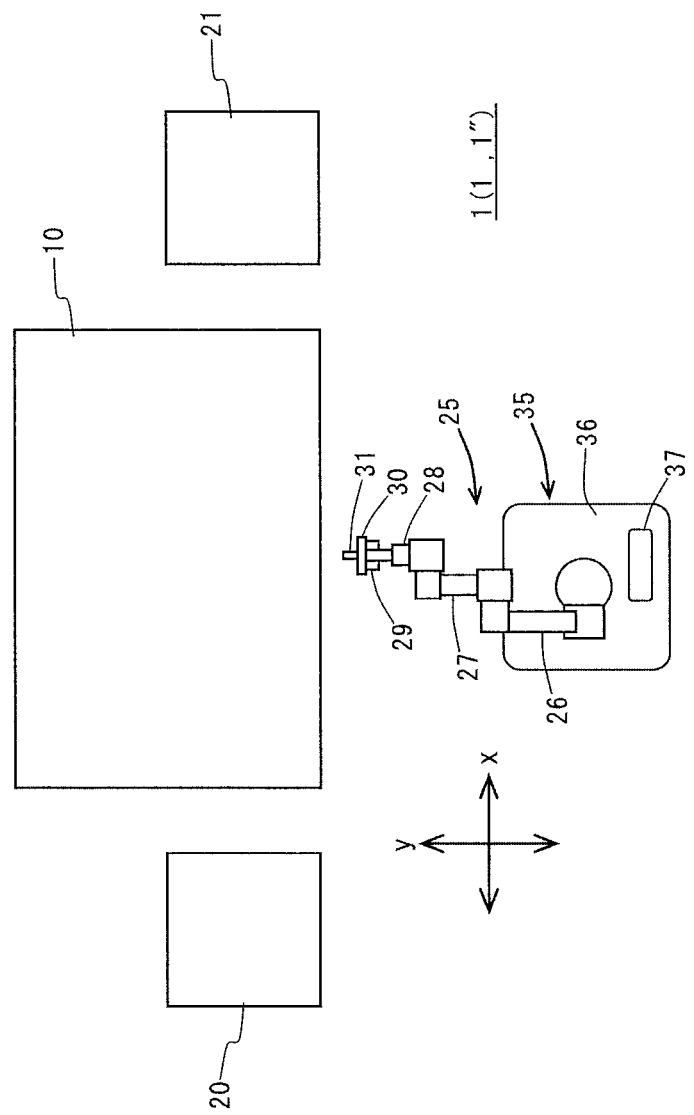
FIG. 1 is a plan view schematically illustrating a configuration of a system according to an embodiment of the present invention.
Figure 2:
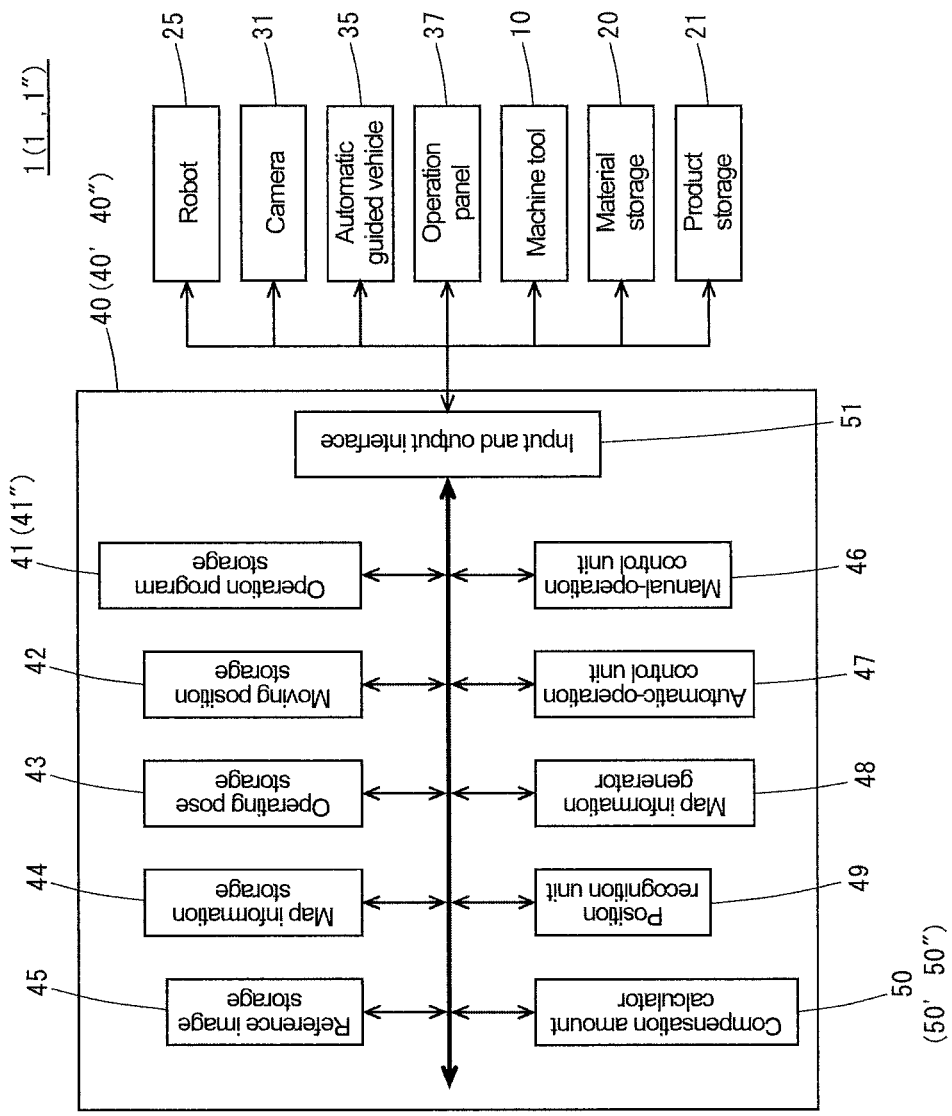
FIG. 2 is a block diagram illustrating the configuration of the system according to the embodiment.

As shown in FIGS. 1 and 2, a system 1 according to a first embodiment of the present invention includes a machine tool 10, a material storage 20 and a product storage 21 as peripheral devices, an automatic guided vehicle 35, a robot 25 mounted on the automatic guided vehicle 35, a camera 31 attached to the robot 25, and a controller 40 controlling the robot 25 and the automatic guided vehicle 35.

The machine tool in the first embodiment is configured such that an identification figure is arranged in the machine tool. A particularly preferred configuration is such that an identification figure is arranged within a machining area.

The robot-mounted moving device in the first embodiment has a robot that has a camera, a hand unit, a first arm unit, and a second arm unit, a control unit that controls the position of the hand unit of the robot, and a moving unit that has the robot mounted thereon. The moving unit is configured to be movable around the machine tool.

Figure 4:
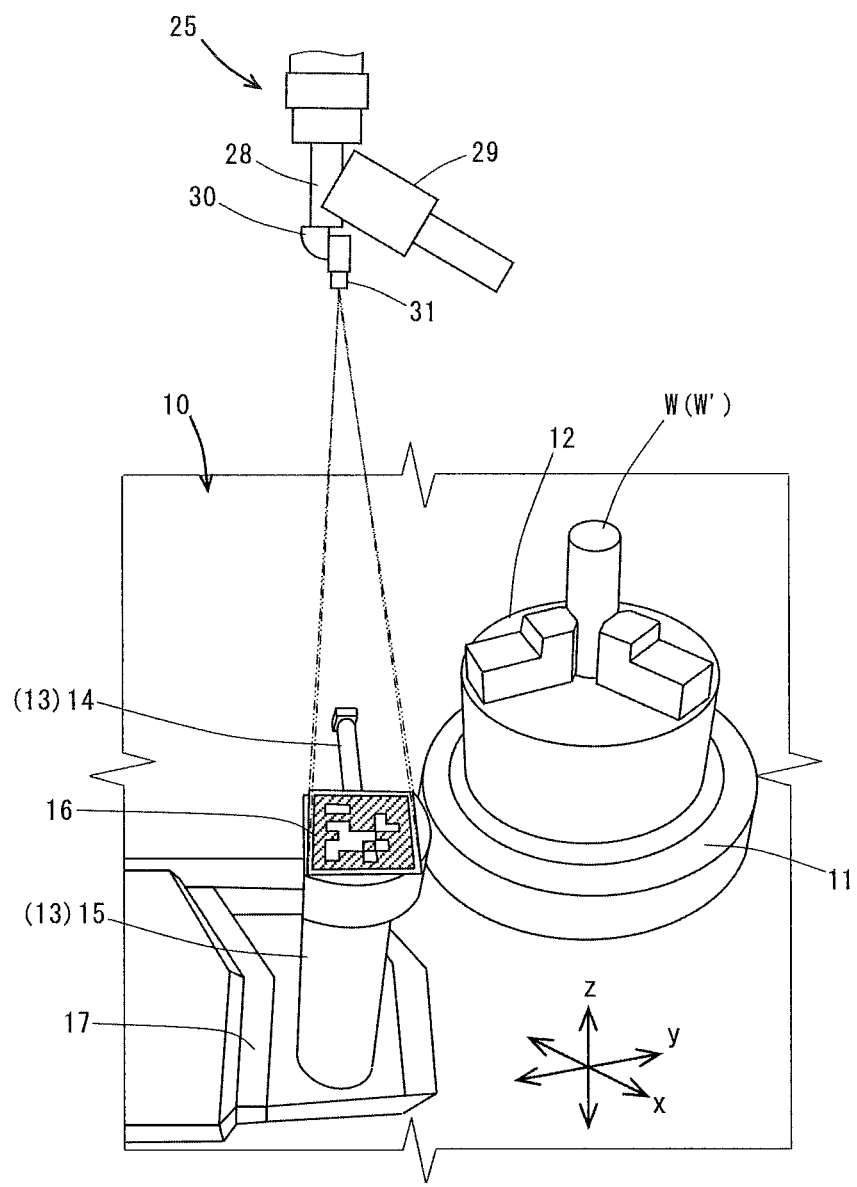
FIG. 4 is a diagram for describing an image capturing pose of the robot in the embodiment.
Figure 5:
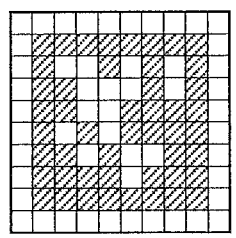
FIG. 5 is a diagram illustrating an identification figure in the embodiment.

As shown in FIG. 4, the machine tool 10 is an NC (numerically-controlled) vertical lathe having a spindle 11 arranged vertically to which a chuck 12 for clamping a workpiece W (W') is attached. The machine tool 10 is capable of performing turning on a workpiece W (W'). The machine tool 10 has a tool presetter 13 arranged in the vicinity of the spindle 11. The tool presetter 13 has a contactor 14 and a support bar 15 supporting the contactor 14. The support bar 15 is movable into and out of a machining area along an axis of the spindle 11 and has a display board 16, which is made of ceramics, on an end surface thereof located on the machining area side. The display board 16 has an identification figure as shown in FIG. 5 drawn thereon. Note that the display board 16 is arranged to be on a horizontal plane.

Note that FIG. 4 shows the support bar 15 and the contactor 14 having been moved into the machining area. After the support bar 15 and the contactor 14 are moved out of the machining area so that the contactor 14 and the display board 16 are retracted into a storage space, a shutter 17 is closed so that the contactor 14 and the display board 16 are isolated from the machining area.

Note further that the identification figure in this example has a matrix structure having a plurality of square pixels arranged two-dimensionally, each pixel being displayed in white or black. In FIG. 5, the pixels displayed in black are hatched. Examples of the identification figure include so-called "AR marker" and "AprilTag". Further, where a small identification figure is used, some measure, e.g., arranging a lens over the identification figure, may be taken to allow the camera 31, which is described later, to capture an enlarged image of the identification figure.

The material storage 20 is disposed on the left of the machine tool 10 in FIG. 1. The material storage 20 stores therein materials (unmachined workpieces W) to be machined in the machine tool 10. The product storage 21 is disposed on the right of the machine tool 10 in FIG. 1. The product storage 21 stores therein products or semi-finished products (machined workpieces W') machined in the machine tool 10.

As shown in FIG. 1, the automatic guided vehicle 35 has a mount surface 36 as its top surface, on which the robot 25 is mounted. Further, the automatic guided vehicle 35 has an operation panel 37 attached thereto which an operator can carry around. The operation panel 37 has an input and output unit for input and output of data, an operation unit for manual operation of the automatic guided vehicle 35 and the robot 25, and a display capable of displaying a picture thereon.

Further, the automatic guided vehicle 35 has a sensor (for example, a distance measurement sensor using a laser beam) which enables recognition of the position of the automatic guided vehicle 35 in a plant, and the automatic guided vehicle 35 is configured to travel tracklessly in the plant, including the area where the machine tool 10, the material storage 20, and the product storage 21 are disposed, under control by the controller 40. The automatic guided vehicle 35 in this embodiment moves to operating positions respectively set with respect to the machine tool 10, the material storage 20, and the product storage 21.

Figure 3:
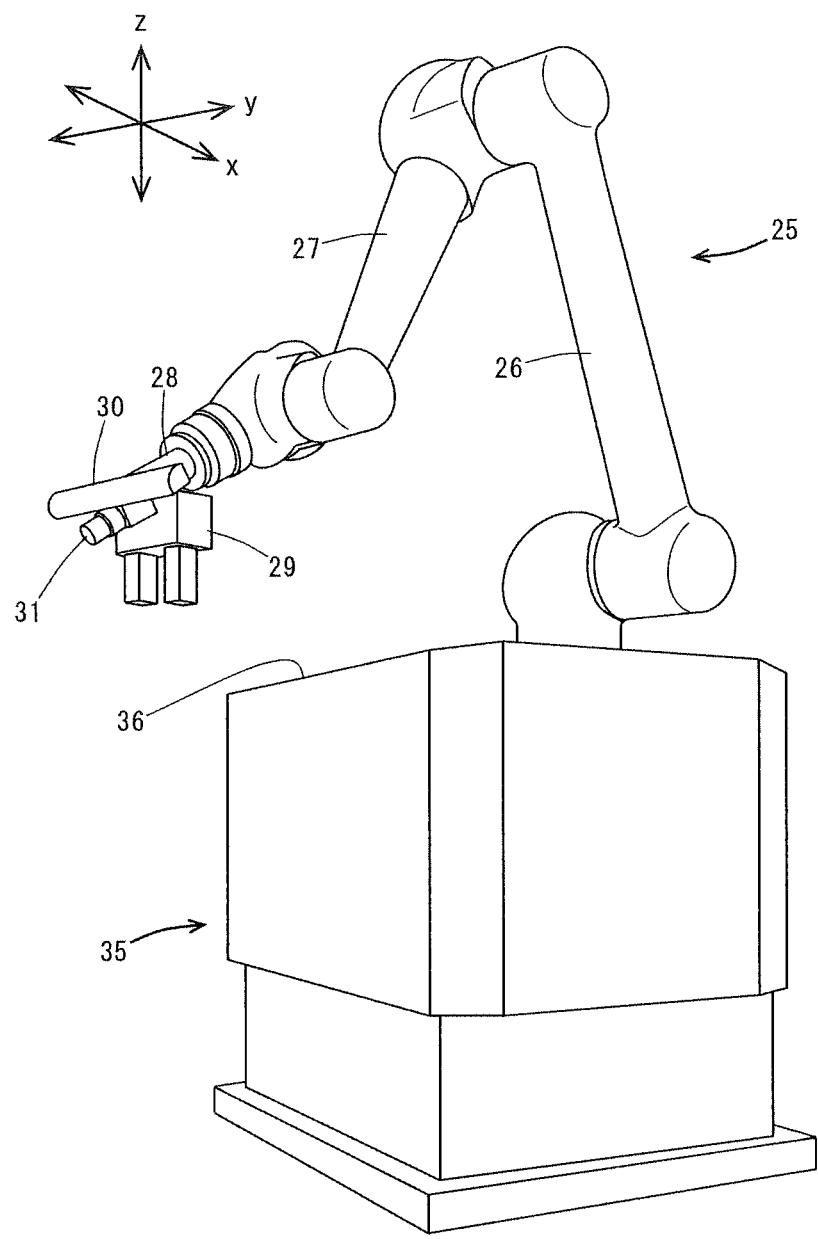
FIG. 3 is a perspective view illustrating an automatic guided vehicle and a robot in the embodiment.

As shown in FIGS. 1 and 3, the robot 25 in this embodiment is an articulated robot having three arms, i.e., a first arm 26, a second arm 27, and a third arm 28. The third arm 28 has a hand 29 as an end effector attached to a distal end thereof, and also has one camera 31 attached to the distal end thereof via a support bar 30.

Note that the robot is not limited to this configuration. The robot has only to have (i) a camera, (ii) a hand unit for gripping a workpiece or a tool, (iii) a second arm unit to which the hand unit is movably connected, and (iv) a first arm unit to which the second arm unit is movably connected. As compared with the robot 25 in this embodiment, the hand 29 corresponds to the hand unit, the second arm 27 and a joint rotatably (movably) coupled to the second arm 27 correspond to the second arm unit, and the first arm 26 and a joint rotatably (movably) coupled to the first arm 26 correspond to the first arm unit. Note that the third arm 28 and a joint rotatably and reciprocatably (movably) coupled to the third arm 28 may be deemed to correspond to the second arm unit. That is to say, although the robot 25 in this embodiment has three arms, the robot has only to have at least two arms.

As shown in FIG. 2, the controller 40 in this embodiment consists of an operation program storage 41, a moving position storage 42, an operating pose storage 43, a map information storage 44, a reference image storage 45, a manual-operation control unit 46, an automatic-operation control unit 47, a map information generator 48, a position recognition unit 49, a compensation amount calculator 50, and an input and output interface 51. The controller 40 is connected to the machine tool 10, the material storage 20, the product storage 21, the robot 25, the camera 31, the automatic guided vehicle 35, and the operation panel 37 via the input and output interface 51. Note that the controller 40 is not limited to this configuration. The controller 40 has only to have at least a control unit controlling the position of the hand unit of the robot, and the other storages and units may be included in other devices.

Note that the controller 40 is composed of a computer including a CPU, a RAM, and a ROM. The manual-operation control unit 46, the automatic-operation control unit 47, the map information generator 48, the position recognition unit 49, the compensation amount calculator 50, and the input and output interface 51 are functionally implemented by a computer program to carry out the processes described later. The operation program storage 41, the moving position storage 42, the operating pose storage 43, the map information storage 44, and the reference image storage 45 are composed of an appropriate storage medium, such as a RAM. In this embodiment, the controller 40 is attached to the automatic guided vehicle 35, and is connected to the machine tool 10, the material storage 20, and the product storage 21 through appropriate communication means and connected to the robot 25, the camera 31, the automatic guided vehicle 35, and the operation panel 37 by wire or wirelessly. However, the controller 40 is not limited to such a configuration and may be disposed at an appropriate position other than the automatic guided vehicle 35. In such a case, the controller 40 is connected to the above-mentioned elements through appropriate communication means.

The manual-operation control unit 46 is a functional unit that causes the automatic guided vehicle 35, the robot 25, and the camera 31 to operate in accordance with operation signals input by an operator through the operation panel 37. That is to say, an operator can manually operate the automatic guided vehicle 35, the robot 25, and the camera 31 through the operation panel 37, which is controlled by the manual-operation control unit 46.

The operation program storage 41 is a functional unit that stores therein an automatic-operation program for causing the automatic guided vehicle 35 and the robot 25 to automatically operate during production, and a map generation program for causing the automatic guided vehicle 35 to operate during generation of map information of the plant, which is described later. The automatic-operation program and the map generation program are stored into the operation program storage 41, for example, by being input through the input and output unit of the operation panel 37.

The automatic-operation program contains command codes regarding a moving position as a target position to which the automatic guided vehicle 35 is moved, a moving speed of the automatic guided vehicle 35, and an orientation of the automatic guided vehicle 35. The automatic-operation program further contains command codes regarding operations to be carried out in sequence by the robot 25 and command codes for causing the camera 31 to operate. The map generation program contains command codes for causing the automatic guided vehicle 35 to travel tracklessly all over the plant to cause the map information generator 48 to generate map information.

The map information storage 44 is a functional unit that stores therein map information including information on arrangement of machines, devices, instruments, etc. (hereinafter, collectively referred to as "devices") arranged in the plant where the automatic guided vehicle 35 travels. The map information is generated by the map information generator 48.

The map information generator 48 obtains spatial information of the plant from distance data detected by the sensor when the automatic guided vehicle 35 is caused to travel in accordance with the map generation program stored in the operation program storage 41 under control by the automatic-operation control unit 47, which is described in detail later, of the controller 40. The map information generator 48 also recognizes planar shapes of the devices arranged in the plant, and, for example, based on previously registered planer shapes of the devices, recognizes the positions, planer shapes, etc. of particular devices (in this example, the machine tool 10, the material storage 20, and the product storage 21) arranged in the plant (arrangement information). The map information generator 48 stores the obtained spatial information and arrangement information as map information of the plant into the map information storage 44.

The position recognition unit 49 is a functional unit that recognizes the position of the automatic guided vehicle 35 in the plant based on the distance data detected by the sensor and the map information of the plant stored in the map information storage 44. Based on the position of the automatic guided vehicle 35 recognized by the position recognition unit 49, the automatic-operation control unit 47 controls operation of the automatic guided vehicle 35.

The moving position storage 42 is a functional unit that stores therein specific moving positions. The moving positions are specific target positions to which the automatic guided vehicle 35 is moved, and correspond to the above-described command codes contained in the operation program. The moving positions include the above-mentioned operating positions set with respect to the machine tool 10, the material storage 20, and the product storage 21. Note that the moving positions are set, for example, as follows: the automatic guided vehicle 35 is manually operated through the operation panel 37 so that it is moved to each target position under control by the manual-operation control unit 46, and position data recognized by the position recognition unit 49 at each target position is stored into the moving position storage 42. This operation is generally called "teaching operation".

The operating pose storage 43 is a functional unit that stores therein data regarding poses (operating poses) of the robot 25, into which the robot 25 is brought in sequence when it is operated in a predetermined sequence. The operating poses correspond to the command codes contained in the operation programs. This operating pose data is composed of rotational angle data of joints (motors) of the robot 25 in each target pose. This rotational angle data is obtained by, in the teaching operation using the operation panel 37 in which the robot 25 is operated under control by the manual-operation control unit 46, manually bringing the robot 25 into each target pose. The obtained rotational angle data is stored as operating pose data into the operating pose storage 43.

Specific operating poses of the robot 25 are set with respect to each of the material storage 20, the machine tool 10, and the product storage 21. For example, a set of extraction poses is set with respect to the material storage 20, the set of extraction poses consisting of an operation starting pose (extraction starting pose) for starting extraction to the material stocker 20, operating positions (extracting poses) for causing the hand 29 to grip an unmachined workpiece W stored in the material storage 20 and extract the unmachined workpiece W from the material storage 20, and a pose for finishing the extraction (extraction finishing pose; in this embodiment, this pose is identical to the extraction starting pose).

A set of workpiece-removal poses for removing a machined workpiece W' from the machine tool 10 and a set of workpiece-attachment poses for attaching an unmachined workpiece W to the machine tool 10 are set with respect to the machine tool 10.

Specifically, the set of workpiece-removal poses consists of, for example, an operation starting pose preceding insertion into the machine tool 10, a pose for moving the hand 29 and the camera 31 into the machining area of the machine tool 10, positioning the camera 31 directly opposite the identification figure on the support bar 15, and casing the camera 31 to capture an image of the identification figure (image capturing pose; see FIG. 4), a pose for positioning the hand 29 opposite a machined workpiece W' clamped by the chuck 12 of the machine tool 10 (removal preparing pose), a pose for moving the hand 29 toward the chuck 12 and causing the hand 29 to grip the machined workpiece W' clamped by the chuck 12 (gripping pose), a pose for moving the hand 29 away from the chuck 12 to pull the machined workpiece W' out of the chuck 12 (pulling pose), and a pose for moving the hand 29 and the camera 31 out of the machine tool 10 (operation finishing pose). Note that the camera 31 as facing the identification figure arranged horizontally is in a pose such that a lens of the camera 31 is substantially parallel to the identification figure.

The set of workpiece-attachment poses consists of, for example, an operation starting pose preceding insertion into the machine tool 10, a pose for moving the hand 29 and the camera 31 into the machining area of the machine tool 10, positioning the camera 31 directly opposite the identification figure on the support bar 15, and causing the camera 31 to capture an image of the identification figure (image capturing pose; see FIG. 4), a pose for positioning a unmachined workpiece W gripped by the hand 29 opposite the chuck 12 of the machine tool 10 (attachment preparing pose), a pose for moving the hand 29 toward the chuck 12 to allow the chuck 12 to clamp the unmachined workpiece W (attaching pose), a pose for moving the hand 29 away from the chuck 12 (moving-away pose), and a pose for moving the hand 29 and the camera 31 out of the machine tool 10 (operation finishing pose).

A set of storage poses is set with respect to the product storage 21, the set of storage poses consisting of an operation starting pose for starting storage to the product storage 21 (storage starting pose), operating poses for storing a machined workpiece W' gripped by the hand 29 into the product storage 21 (storing poses), and a pose for finishing the storage (storage finishing pose; in this embodiment, this pose is identical to the storage starting pose).

The automatic-operation control unit 47 is a functional unit that causes the automatic guided vehicle 35, the robot 25, and the camera 31 to operate in accordance with the automatic-operation program or map generation program stored in the operation program storage 41. In this process, the data stored in the moving position storage 42 and the operating pose storage 43 are used as necessary.

The reference image storage 45 is a functional unit that stores therein, as a reference image, an image obtained by, in the teaching operation, causing the camera 31 to capture an image of the identification figure on the support bar 15 of the tool presetter 13 when the automatic guided vehicle 35 is positioned at the operating position set with respect to the machine tool 10 and the robot 25 is in the image capturing pose.

When the robot 25 is automatically operating in accordance with the automatic-operation program stored in the operation program storage 41 under control by the automatic-operation control unit 47, once an image of the identification figure is captured by the camera 31 with the robot 25 in the image capturing pose, the compensation amount calculator 50 estimates, based on the captured current image of the identification figure and the reference image (image captured in the teaching operation) stored in the reference image storage 45, positional error amounts of the camera 31 in two axes which are orthogonal to each other and set in a plane parallel to the identification figure and a rotational error amount of the camera 31 around a vertical axis orthogonal to the plane between a current pose of the robot 25 and the pose of the robot 25 in the teaching operation. Based on the estimated error amounts, the compensation amount calculator 50 calculates a compensation amount for the acting part in the operating poses of the robot 25.

Figure 6:
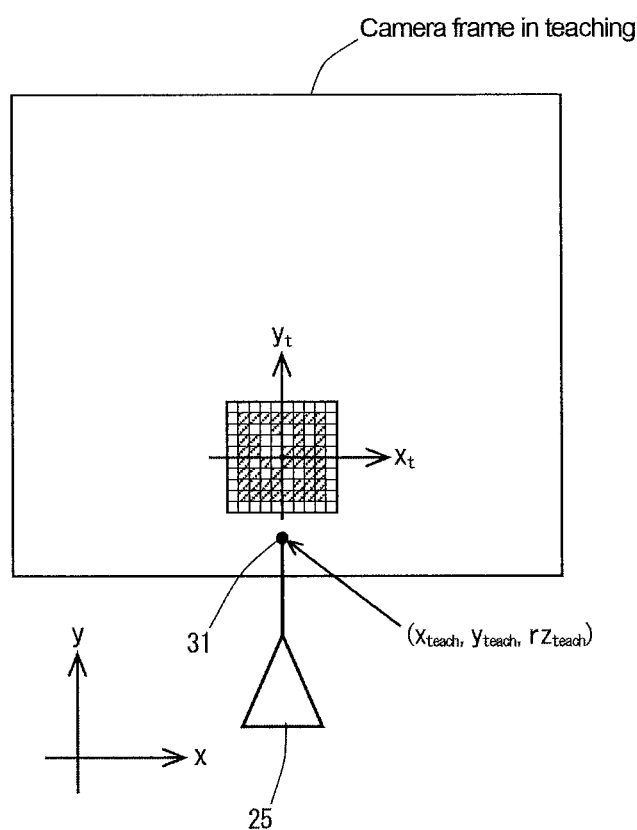
FIG. 6 is a diagram for describing a compensation amount calculating method in the embodiment.
Figure 7:
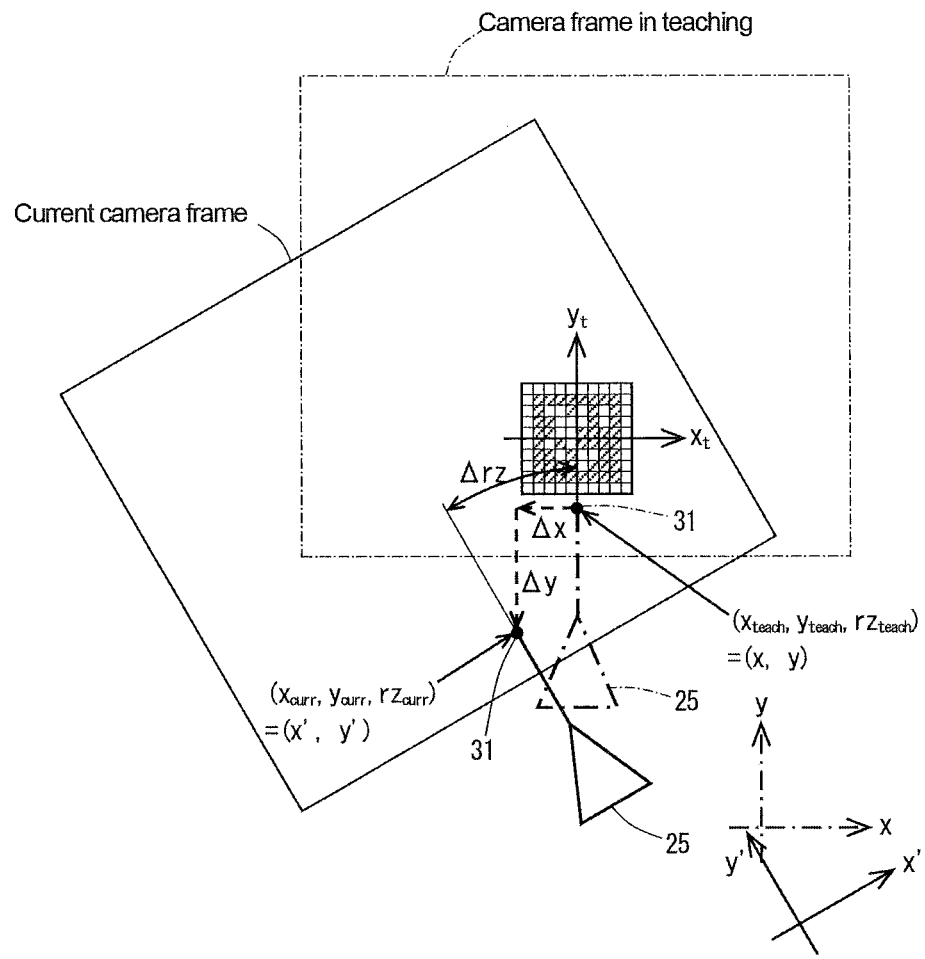
FIG. 7 is a diagram for describing the compensation amount calculating method in the embodiment.

FIG. 6 shows an image of the identification figure captured by the camera 31 in the teaching operation, i.e., the reference image. The solid rectangular line in FIG. 6 represents a field of view of the camera 31, in other words, an outline of the reference image. FIG. 7 shows a current image of the identification figure captured in the automatic operation, which is depicted in a solid line. Note that, in FIG. 7, the solid rectangular line represents an outline of the current image and the dashed-and-dotted rectangular line represents the outline of the reference image. FIG. 7 shows that the current image is shifted from the reference image because the current image capturing pose of the robot 25 is shifted from the image capturing pose of the robot 25 in the teaching operation.

The compensation amount calculator 50 first analyzes the reference image shown in FIG. 6 that has been captured in the teaching operation, thereby calculating a position in teaching ($x_{teach}$, $y_{teach}$, $rz_{teach}$) of the camera 31 in a robot coordinate system (x-axis and y-axis coordinate system), for example, based on a figure coordinate system ($x_f$-axis and $y_f$-axis coordinate system) set from the reference image, in other words, from the identification figure on a frame of the camera 31. The position in teaching ($x_{teach}$, $y_{teach}$, $rz_{teach}$) of the camera 31 is calculated in accordance with a predetermined transformation between the figure coordinate system ($x_f$-axis and $y_f$-axis coordinate system) and the robot coordinate system (x-axis and y-axis coordinate system). Note that the x-axis and the y-axis are orthogonal to each other and parallel to the identification figure and serve as coordinate axes for the robot 25 in the teaching operation, and rz is a rotational angle of the camera 31 around a z-axis orthogonal to both the x-axis and the y-axis. Note further that the $x_f$-axis, the $y_f$-axis, the x-axis, and the y-axis in this embodiment are set in a horizontal plane (the same applies to the x'-axis and y'-axis described later).

Subsequently, the compensation amount calculator 50 analyzes the current image in the same manner, thereby calculating a current position ($x_{curr}$, $y_{curr}$, $rz_{curr}$) of the camera 31 in the coordinate system (x-axis and y-axis coordinate system) for the robot 25 in the teaching operation in accordance with the aforementioned transformation based on the figure coordinate system ($x_f$-axis and $y_f$-axis coordinate system) set from the identification figure on a frame of the camera 31.

Subsequently, the compensation amount calculator 50 estimates positional error amounts Δx, Δy and a rotational error amount Δrz between the position in teaching and current position of the camera 31 in the x-axis and y-axis coordinate system in accordance with Equations 1 to 3 below.

$$\Delta x = x_{curr} - x_{teach} \tag{Equation 1}$$

$$\Delta y = y_{curr} - y_{teach} \tag{Equation 2}$$

$$\Delta rz = rz_{curr} - rz_{teach} \tag{Equation 3}$$

Figure 8:
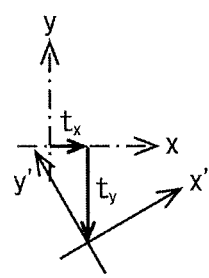
FIG. 8 is a diagram for describing the compensation amount calculating method in the embodiment.

Hereinafter, as shown in FIG. 7, a current coordinate system for the robot 25 is referred to as "x'-axis and y'-axis coordinate system". Assuming that there are translational errors $t_x$, $t_y$ as shown in FIG. 8 between the x'-axis and y'-axis coordinate system and the x-axis and y-axis coordinate system for the robot 25 in the teaching operation, the current position (x', y') of the camera 31 in the x'-axis and y'-axis coordinate system can be calculated in accordance with Equation 4 below. Note that x and y in Equation 4 indicate the position in teaching ($x_{teach}$, $y_{teach}$) of the camera 31 in the x-axis and y-axis coordinate system, which is one of initially set values already known.

$$\begin{bmatrix} x' \\ y' \end{bmatrix} = \begin{bmatrix} \cos\Delta rz & -\sin\Delta rz \\ \sin\Delta rz & \cos\Delta rz \end{bmatrix} \begin{bmatrix} x + \Delta x \\ y + \Delta y \end{bmatrix} + \begin{bmatrix} t_x \\ t_y \end{bmatrix} \quad \text{(Equation 4)}$$

The translational errors $t_x$, $t_y$ can be calculated in accordance with Equation 5 below that is obtained by transforming Equation 4. The compensation amount calculator 50 calculates the amounts of translational errors $t_x$, $t_y$ in accordance with Equation 5 and sets the amount of translational errors $t_x$, $t_y$ and the rotational error amount $\Delta rz$ as compensation amounts in the operating poses.

$$\begin{bmatrix} t_x \\ t_y \end{bmatrix} = \begin{bmatrix} x' \\ y' \end{bmatrix} - \begin{bmatrix} \cos\Delta rz & -\sin\Delta rz \\ \sin\Delta rz & \cos\Delta rz \end{bmatrix} \begin{bmatrix} x + \Delta x \\ y + \Delta y \end{bmatrix} \quad \text{(Equation 5)}$$

The current position (x', y') of the camera 31 in the x'-axis and y'-axis coordinate system coincides with the current position (x+$\Delta x$, y+$\Delta y$) of the camera 31 in the x-axis and y-axis coordinate system.

The automatic-operation control unit 47 compensates, based on the compensation amounts calculated by the compensation amount calculator 50, the position of the hand 29 of the robot 25 in each operating pose of the robot 25 for performing operations to the machine tool 10, e.g., the removal preparing pose, gripping pose, and pulling pose of the set of workpiece-removal poses and the attachment preparing pose, attaching pose, and moving-away pose of the set of workpiece-attachment poses.

For example, when the hand 29 of the robot 25 is positioned with respect to the chuck 12, the position at which the hand 29 is to be positioned in the x'-axis and y'-axis coordinate system, i.e., in the current coordinate system for the robot 25, is compensated so that it coincides with the position at which the hand 29 was positioned in the teaching operation in the x-axis and y-axis coordinate system.

Figure 9:
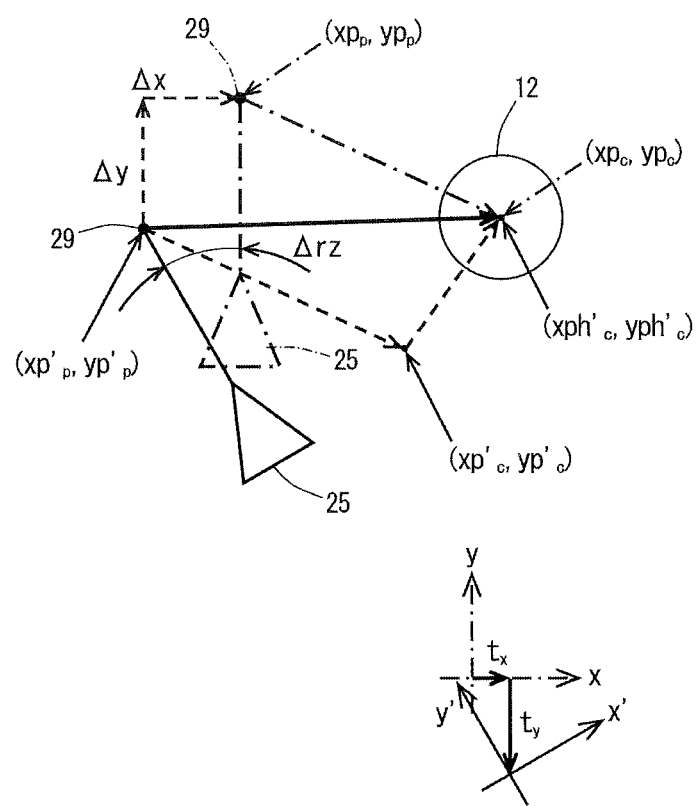
FIG. 9 is a diagram for describing position compensation in the embodiment.

The manner of this compensation is illustrated in FIG. 9. In FIG. 9, the position $xp_p$, $yp_p$ and the position $xp_c$, $yp_c$ each indicate a position set for the hand 29 in the x-axis and y-axis coordinate system that is the robot coordinate system in the teaching operation. The hand 29 is to be positioned to the position $xp_c$, $yp_c$ set with respect to the chuck 12 from the position $xp_p$, $yp_p$ at which the hand 29 is positioned in the image capturing pose. Where the automatic guided vehicle 35 and robot 25 positioned at the operating position have no positional shift, the hand 29 is moved from the position $xp_p$, $yp_p$ to the position $xp_p$, $yp_c$.

In FIG. 9, the position $xp'_p$, $yp'_p$ indicates a position of the hand 29 in the image capturing pose in the x'-axis and y'-axis coordinate system that is the robot coordinate system in the current operation. The position $xp'_p$, $yp'_p$ in the x'-axis and y'-axis coordinate system, which corresponds to the above-described position $xp_p$, $yp_p$ in the teaching operation, has positional errors $\Delta x$, $\Delta y$ and a rotational error $\Delta rz$ with respect to the position $xp_p$, $yp_p$ because the automatic guided vehicle 35 and robot 25 positioned at the operating position have a positional shift. The position $xp'_c$, $yp'_c$ in the x'-axis and y'-axis coordinate system, which corresponds to the above-described position $xp_c$, $yp_c$, is shifted from the true position of the chuck 12. Therefore, the automatic-operation control unit 47 calculates a compensated position $xph'_c$, $yph'_c$ in accordance with Equation 6 below based on the translational error amounts $t_x$, $t_y$ calculated by the compensation amount calculator 50 and the rotational error amount $\Delta rz$, and moves the hand 29 to the compensated position $xph'_c$, $yph'_c$. The automatic-operation control unit 47 also compensates the rotational pose of the hand 29 around the z-axis based on the rotational error amount $\Delta rz$.

$$\begin{bmatrix} xph'_c \\ yph'_c \end{bmatrix} = \begin{bmatrix} \cos\Delta rz & -\sin\Delta rz \\ \sin\Delta rz & \cos\Delta rz \end{bmatrix} \begin{bmatrix} xp_c \\ yp_c \end{bmatrix} + \begin{bmatrix} t_x \\ t_y \end{bmatrix} \quad \text{(Equation 6)}$$

This position data $xph'_c$, $yph'_c$ is transformed into angle data for the joints of the robot 25 in accordance with a predetermined transformation, and the robot 25 is controlled in accordance with the angle data.

Equation 7 below that is obtained by generalizing Equation 6 can calculate a compensated position $xph'_i$, $yph'_i$ for the position $xp_i$, $yp_i$ of the hand 29 in each of the operating poses of the robot 25 for performing the operation to the machine tool 10 that are set in the teaching operation. The automatic-operation control unit 47 compensates the rotational pose of the hand 29 around the z-axis based on the rotational error amount $\Delta rz$ and moves the hand 29 to the thus-calculated compensated position $xph'_i$, $yph'_i$. In Equation 9, i is a natural number equal to or greater than 1.

$$\begin{bmatrix} xph'_i \\ yph'_i \end{bmatrix} = \begin{bmatrix} \cos\Delta rz & -\sin\Delta rz \\ \sin\Delta rz & \cos\Delta rz \end{bmatrix} \begin{bmatrix} xp_i \\ yp_i \end{bmatrix} + \begin{bmatrix} t_x \\ t_y \end{bmatrix} \quad \text{(Equation 7)}$$

The system 1 according to this embodiment having the above-described configuration performs unmanned and automated production in the following manner.

That is to say, the automatic-operation program stored in the operation program storage 41 is executed under control by the automatic-operation control unit 47 of the controller 40, so that, for example, the automatic guided vehicle 35 and the robot 25 operate in the following manner in accordance with the automatic-operation program.

First, the automatic guided vehicle 35 moves to the operating position set with respect to the machine tool 10 and the robot 25 is brought into the operation starting pose of the set of workpiece-removal poses. At this time, the machine tool 10 has finished a predetermined machining operation, a door cover thereof has been opened so that the robot 25 can enter the machining area, and the support bar 15 of the tool presetter 13 has been moved into the machining area upon receipt of a command from the automatic-operation control unit 47.

Subsequently, the robot 25 is brought into the image capturing pose and the camera 31 captures an image of the identification figure arranged on the support bar 15. Once the camera 31 captures the image of the identification figure, the compensation amount calculator 50 estimates positional error amounts $\Delta x$, $\Delta y$ and a rotational error mount $\Delta rz$ between a current image capturing pose of the robot 25 and the image capturing pose of the robot 25 in the teaching operation in accordance with Equations 1 to 3 above based on the captured image of the identification figure and the reference image stored in the reference image storage 45. Based on the estimated error amounts, the compensation amount calculator 50 calculates translational-error compensation amounts $t_x$, $t_y$ and a rotational-error compensation amount $\Delta rz$ for the subsequent operating poses of the set of workpiece-removal poses of the robot 25 in accordance with Equations 4 and 5 above.

Based on the compensation amounts calculated by the compensation amount calculator 50, the automatic-operation control unit 47 compensates the position of the hand 29 in accordance with Equation 7 above and compensates the rotational position of the hand 29 around the z-axis in each of the subsequent operating poses, i.e., the removal preparing pose, gripping pose, pulling pose, and operation finishing pose, of the set of workpiece-removal poses so as to cause the hand 29 to grip a machined workpiece W' clamped by the chuck 12 of the machine tool 10 and remove the machined workpiece W' from the machine tool 10. Note that, after the robot 25 is brought into the gripping pose, the automatic-operation control unit 47 transmits a chuck open command to the machine tool 10 to open the chuck 12.

Subsequently, the automatic-operation control unit 47 moves the automatic guided vehicle 35 to the operating position set with respect to the product storage 21 and brings the robot 25 in sequence into the storage starting pose for starting storage to the product storage 21, the storing poses for storing the machined workpiece gripped by the hand 29 into the product storage 21, and the storage finishing pose for finishing the storage. Thereby, the machined workpiece gripped by the hand 29 is stored into the product storage 21.

Subsequently, the automatic-operation control unit 47 moves the automatic guided vehicle 35 to the operating position set with respect to the material storage 20 and brings the robot 25 in sequence into the extraction starting pose for staring extraction to the material storage 20, the extracting poses for causing the hand 29 to grip a unmachined workpiece stored in the material storage 20 and extract the unmachined workpiece from the material storage 20, and the extraction finishing pose for finishing the extraction. Thereby, a unmachined workpiece is gripped by the hand 29.

Subsequently, the automatic-operation control unit 47 moves the automatic guided vehicle 35 to the operating position set with respect to the machine tool 10 again and brings the robot 25 into the operation starting pose of the set of workpiece-attachment poses. Subsequently, the automatic-operation control unit 47 brings the robot 25 into the image capturing pose and causes the camera 31 to capture an image of the identification figure arranged on the support bar 15. Once the camera 31 captures the image of the identification figure, the compensation amount calculator 50 estimates positional error amounts $\Delta x$, $\Delta y$ and a rotational error mount $\Delta rz$ between a current image capturing pose of the robot 25 and the image capturing pose of the robot 25 in the teaching operation in accordance with Equations 1 to 3 above based on the captured image of the identification figure and the reference image stored in the reference image storage 45. Based on the estimated error amounts, the compensation amount calculator 50 calculates translational-error compensation amounts $t_x$, $t_y$ and a rotational-error compensation amount $\Delta rz$ for the subsequent operating poses of the set of workpiece-attachment poses of the robot 25 in accordance with Equations 4 and 5 above.

Subsequently, based on the compensation amounts calculated by the compensation amount calculator 50, the automatic-operation control unit 47 compensates the position of the hand 29 in accordance with Equation 7 above and compensates the rotational position of the hand 29 around the z-axis in each of the subsequent operating poses, i.e., the attachment preparing pose, attaching pose, moving-away pose, and operation finishing pose, of the set of workpiece-attachment poses of the robot 25 so as to cause the robot 25 to attach the unmachined workpiece W gripped by the hand 29 to the chuck 12 of the machine tool 10 and then move out of the machine tool 10. Thereafter, the automatic-operation control unit 47 transmits a machining start command to the machine tool 10 to cause the machine tool 10 to perform a machining operation. Note that, after bringing the robot 25 into the attaching pose, the automatic-operation control unit 47 transmits a chuck close command to the machine tool 10 to close the chuck 12, so that the unmachined workpiece W is clamped by the chuck 12.

By repeating the above-described series of processes, the system 1 continuously performs unmanned and automated production.

The system 1 according to this embodiment is configured to compensate the operating poses of the robot 25 by the use of the identification figure arranged in the machining area of the machining tool 10 where the robot 25 actually performs the operations; therefore, the operating poses of the robot 25 are accurately compensated. This enables the robot 25 to accurately carry out even an operation which requires high operating accuracy.

Since the robot 25 accurately carries out the operations, the system 1 operates with high availability without unnecessary interruption. Consequently, the system 1 enables an unmanned system with high reliability and high production efficiency.

Further, the system 1 is configured such that, when the robot 25 operates in accordance with an operation program, an image of the identification figure is captured by the camera 31 in a single operation. Therefore, the system 1 carries out accurate compensation in a shorter time than the conventional system.

Further, the identification figure in this embodiment is arranged on the support bar 15 of the tool presetter 13 that is stored outside the machining area while machining is performed in the machine tool 10; therefore, the identification figure is prevented from being soiled by chips or the like produced during the machining. Consequently, the compensation is accurately carried out.

Further, the identification figure in this embodiment has a matrix structure having a plurality of pixels arranged two-dimensionally; therefore, the positional error amounts $\Delta x$, $\Delta y$ and the rotational error amount $\Delta rz$ are estimated with high accuracy and with high repeatability.

Second Embodiment

Next, a second embodiment of the present invention is described. A system configured according to the second embodiment is denoted by reference numeral 1' in FIG. 2. As shown in FIG. 2, the system 1' according to the second embodiment has a controller 40' including a compensation amount calculator 50' configured differently from that in the system 1 according to the first embodiment. The other components are identical to those of the system 1 according to the first embodiment. Therefore, description of the components other than the compensation amount calculator 50' is omitted in the following description. Note that, in this embodiment, when the robot 25 is in the image capturing pose, it is preferred that the camera 31 is positioned directly opposite the identification figure as in the above-described first embodiment, because this enables highly accurate compensation. However, the camera 31 may, instead of being positioned directly opposite the identification figure, be brought into a pose such that an image-capturing optical axis of the camera 31 is inclined with respect to the identification figure, because such a pose enables practical compensation.

The compensation amount calculator 50' according to this embodiment is configured to calculate positional error amounts and rotational error amounts of the camera 31 between a current pose of the robot 25 and the pose of the robot 25 acquired in the teaching operation by using a method obtained by generalizing the error-amount calculating method used in the compensation amount calculator 50, and compensate each operating pose of the robot 25 based on the calculated positional error amounts and rotational error amount.

Specifically, the compensation amount calculator 50' carries out the process described below based on a current image of the identification figure captured in an automatic operation and the reference image stored in the reference image storage 45 (the image of the identification figure captured in the teaching operation) to estimate positional error amounts of the camera 31 in an x-axis, a y-axis, and a z-axis and rotational error amounts of the camera 31 around the x-axis, the y-axis, and the z-axis between a current pose of the robot 25 and the pose of the robot 25 acquired in the teaching operation and compensate each operating pose of the robot 25 based on the estimated positional error amounts and rotational error amounts. The x-axis and the y-axis are orthogonal to each other and set in a plane parallel to the identification figure, and the z-axis is orthogonal to both the x-axis and the y-axis.

Preliminary Processing

First, the compensation amount calculator 50' preliminarily obtains, based on the reference image captured in the teaching operation, a coordinate transformation matrix $M_{fig}^{camera\_teach}$ for transformation from a camera coordinate system that corresponds to the camera 31 to a figure coordinate system that corresponds to the identification figure. Note that the coordinate transformation matrix $M_{fig}^{camera\_teach}$ can be obtained from, for example, internal parameters of the camera 31, the size of the identification figure, and a homography matrix, a center coordinate, and corner coordinates recognized from the identification figure.

The camera coordinate system is a three-dimensional coordinate system set with respect to a planar image sensor group of the camera, which, for example, has its origin at the center of the image sensor group. The figure coordinate system is a three-dimensional coordinate system set with respect to the identification figure, which, for example, has its origin at the center of the identification figure. Robot coordinate systems, which are described later, are each a three-dimensional coordinate system set for the controller 40' to control the robot 25, which has its origin at an appropriate position.

Subsequently, the compensation amount calculator 50' calculates a camera position in teaching $P_{fig}^{camera\_teach}$ in the figure coordinate system in accordance with Equation 8 below based on the obtained coordinate transformation matrix $M_{fig}^{camera\_teach}$ and an image-capturing camera position in teaching $P_{camera\_teach}^{camera\_teach}$ in the camera coordinate system.

$$\begin{bmatrix} P_{fig}^{camera\_teach} \\ 1 \end{bmatrix} = M_{fig}^{camera\_teach} \cdot \begin{bmatrix} P_{camera\_teach}^{camera\_teach} \\ 1 \end{bmatrix} \quad \text{(Equation 8)}$$

Calculation of Camera Position in Teaching

Subsequently, the compensation amount calculator 50' calculates a camera position in teaching $P_{ideal}^{camera\_teach}$ in the teaching robot coordinate system in accordance with Equation 9 below.

$$\begin{bmatrix} P_{ideal}^{camera\_teach} \\ 1 \end{bmatrix} = M_{ideal}^{fig} \cdot \begin{bmatrix} P_{fig}^{camera\_teach} \\ 1 \end{bmatrix} = \quad \text{(Equation 9)}$$

$$[x_{ideal}^{camera\_teach} \ y_{ideal}^{camera\_teach} \ z_{ideal}^{camera\_teach} \ 1]^T$$

Subsequently, the compensation amount calculator 50' calculates a coordinate transformation matrix $M_{ideal}^{camera\_teach}$ for transformation from the teaching camera coordinate system to the teaching robot coordinate system in accordance with Equation 10 below.

$$M_{ideal}^{camera\_teach} = M_{fig}^{camera\_teach} \cdot M_{fig}^{camera\_teach} \quad \text{(Equation 10)}$$

Here, rotational angles $rx_{ideal}^{camera\_curr}$, $ry_{ideal}^{camera\_curr}$, $rz_{ideal}^{camera\_curr}$ around the x-axis, the y-axis, and the z-axis are calculated based on a rotation matrix element $R_{ideal}^{camera\_curr}$ of $M_{ideal}^{camera\_curr}$.

Note that $M_{ideal}^{fig}$ is a coordinate transformation matrix for transformation from the figure coordinate system to the teaching robot coordinate system. It is obtained, for example, in accordance with Equation 11 below based on a coordinate transformation matrix $M_{camera\_teach}^{fig}$ for transformation from the figure coordinate system to the teaching camera coordinate system and a coordinate transformation matrix $M_{ideal}^{camera\_teach}$ for transformation from the teaching camera coordinate system to the teaching robot coordinate system.

$$M_{ideal}^{fig} = M_{ideal}^{camera\_teach} \cdot M_{camera\_teach}^{fig} \quad \text{(Equation 11)}$$

Calculation of Camera Position in Automatic Operation

Subsequently, the compensation amount calculator 50' obtains a coordinate transformation matrix $M_{fig}^{camera\_curr}$ for transformation from the camera coordinate system to the figure coordinate system in a similar manner as above based on a current image of the identification figure captured in an automatic operation (actual operation). Thereafter, based on the current image of the identification figure, the compensation amount calculator 50' calculates a current camera position $P_{fig}^{camera\_curr}$ in the figure coordinate system in accordance with Equation 12 below and calculates a current camera position $P_{ideal}^{camera\_curr}$ in the teaching robot coordinate system in accordance with Equation 13 below.

$$\begin{bmatrix} P_{fig}^{camera\_curr} \\ 1 \end{bmatrix} = M_{fig}^{camera\_curr} \cdot \begin{bmatrix} P_{camera\_curr}^{camera\_curr} \\ 1 \end{bmatrix} \quad \text{(Equation 12)}$$

$$\begin{bmatrix} P_{ideal}^{camera\_curr} \\ 1 \end{bmatrix} = M_{ideal}^{fig} \cdot \begin{bmatrix} P_{fig}^{camera\_curr} \\ 1 \end{bmatrix} = \quad \text{(Equation 13)}$$

$$[x_{ideal}^{camera\_curr} \ y_{ideal}^{camera\_curr} \ z_{ideal}^{camera\_curr} \ 1]^T$$

Subsequently, the compensation amount calculator 50' calculates a coordinate transformation matrix $M_{ideal}^{camera\_curr}$ for transformation from the current camera coordinate system to the teaching robot coordinate system in accordance with Equation 14 below.

$$M_{ideal}^{camera\_curr} = M_{ideal}^{fig} \cdot M_{fig}^{camera\_curr} \quad \text{(Equation 14)}$$

Here, rotational angles $rx_{ideal}^{camera\_curr}$, $ry_{ideal}^{camera\_curr}$, $rz_{ideal}^{camera\_curr}$ around the x-axis, the y-axis, and the z-axis are calculated based on a rotation matrix element $R_{ideal}^{camera\_curr}$ of $M_{ideal}^{camera\_curr}$.

Calculation of Error Amounts

Subsequently, based on the calculated camera angle in teaching $rx_{ideal}^{camera\_teach}$, $ry_{ideal}^{camera\_teach}$, $rz_{ideal}^{camera\_teach}$ in the teaching robot coordinate system and the calculated current camera angle $rx_{ideal}^{camera\_curr}$, $ry_{ideal}^{camera\_curr}$, $rz_{ideal}^{camera\_curr}$ in the teaching robot coordinate system, the compensation amount calculator 50' calculates a difference between them, thereby calculating rotational error amounts Δrx, Δry, and Δrz around the x-axis, the y-axis, and the z-axis.

$$\Delta rx = rx_{ideal}^{camera\_curr} - rx_{ideal}^{camera\_teach}$$

$$\Delta ry = ry_{ideal}^{camera\_curr} - ry_{ideal}^{camera\_teach}$$

$$\Delta rz = rz_{ideal}^{camera\_curr} - rz_{ideal}^{camera\_teach}$$

Subsequently, based on the calculated rotational error amounts Δrx, Δry, and Δrz, the compensation amount calculator 50' calculates a rotation matrix $R_{curr}^{ideal}$ between the teaching robot coordinate system and a current robot coordinate system, i.e., rotational error amounts between them, in accordance with Equation 15 below and calculates a translation matrix $T_{curr}^{ideal}$ from the teaching robot coordinate system to the current robot coordinate system, i.e., positional error amounts between them, in accordance with Equation 16 below.

$$R_{curr}^{ideal} = \begin{bmatrix} \cos\Delta rz & -\sin\Delta rz & 0 \\ \sin\Delta rz & \cos\Delta rz & 0 \\ 0 & 0 & 1 \end{bmatrix} \begin{bmatrix} \cos\Delta ry & 0 & \sin\Delta ry \\ 0 & 1 & 0 \\ -\sin\Delta ry & 0 & \cos\Delta ry \end{bmatrix} \quad \text{(Equation 15)}$$

$$\begin{bmatrix} 1 & 0 & 0 \\ 0 & \cos\Delta rx & -\sin\Delta rx \\ 0 & \sin\Delta rx & \cos\Delta rx \end{bmatrix}$$

$$T_{curr}^{ideal} = P_{curr}^{camera\_curr} - R_{curr}^{ideal} \cdot P_{ideal}^{camera\_curr} \quad \text{(Equation 16)}$$

Calculation of Compensation Amount

Subsequently, based on the calculated error amounts, the compensation amount calculator 50' calculates a compensation amount $M_{curr}^{ideal}$ for compensating for the error amounts in accordance with Equation 17 below.

$$M_{curr}^{ideal} = \begin{bmatrix} R_{curr}^{ideal} & T_{curr}^{ideal} \\ 0 & 1 \end{bmatrix} \quad \text{(Equation 17)}$$

The automatic-operation control unit 47 compensates a position $P_{ideal}^{goal}$ of the hand 29 in each subsequent operating pose of the robot 25 in accordance with Equation 18 below based on the compensation amount calculated by the compensation amount calculator 50'.

$$\begin{bmatrix} P_{curr}^{goal} \\ 1 \end{bmatrix} = M_{curr}^{ideal} \cdot \begin{bmatrix} P_{ideal}^{goal} \\ 1 \end{bmatrix} \quad \text{(Equation 18)}$$

Third Embodiment

A system configured according to a third embodiment of the present invention is denoted by reference numeral 1" in FIG. 2. As shown in FIG. 2, the system 1" according to the third embodiment has a controller 40" including a compensation amount calculator 50" and an operation program storage 41" which are configured differently from those of the systems 1 and 1' according to the first and second embodiments. The other components are identical to those of the systems 1 and 1' according to the first and second embodiments. Therefore, description of the components other than the compensation amount calculator 50" and the operation program storage 41" is omitted in the following description.

The operation program storage 41" in this embodiment stores therein an automatic-operation program which differs from that in the first and second embodiments. The automatic-operation program in this embodiment differs from that in the first and second embodiments in that, in the operations performed by the robot 25 to the machine tool 10, the capturing of an image of the identification figure is carried out twice in a row. Specifically, the automatic-operation program in this embodiment is set such that a first image capturing is carried out for calculating positional error amounts in the x-axis and the y-axis and a rotational error amount around the z-axis, and then a second image capturing is carried out with the image capturing pose of the robot 25 compensated based on the calculated positional error amounts and rotational error amount for calculating a positional error amount in the z-axis and rotational error amounts around the x-axis and the y-axis.

The compensation amount calculator 50" is configured to carry out the "preliminary processing" and "calculation of camera position in teaching", which are carried out in the compensation amount calculator 50' in the second embodiment, and carry out calculation of compensation amounts based on each of images captured in the first and second image capturing processes that are carried out under control by the automatic-operation control unit 47.

First Calculation of Compensation Amounts

The compensation amount calculator 50" carries out the "preliminary processing", the "calculation of camera position in teaching", the "calculation of camera position in automatic operation", the "calculation of error amounts", and the "calculation of compensation amount", which are described with respect to the compensation amount calculator 50 according to the second embodiment', based on an image captured in the first image capturing process, thereby calculating positional error amounts in the x-axis and the y-axis and a rotational error amount around the z-axis and calculating compensation amounts for compensating for the calculated error amounts.

In this process, the "preliminary processing", the "calculation of camera position in teaching", the "calculation of camera position in automatic operation", the "calculation of error amounts", and the "calculation of compensation amount" are carried out with the camera position in the figure coordinate system and each camera position in each robot coordinate system as follows:

$$[x_{fig}^{camera} y_{fig}^{camera} z_{fig}^{camera} rx_{fig}^{camera} ry_{fig}^{camera} rz_{fig}^{camera}] = [x_{fig}^{camera} y_{fig}^{camera} 0 \, 0 \, 0 \, rz_{fig}^{camera}]$$

$$[x_{robot}^{camera} y_{robot}^{camera} z_{robot}^{camera} rx_{robot}^{camera} ry_{robot}^{camera} rz_{robot}^{camera}] = [x_{robot}^{camera} y_{robot}^{camera} 0 \, 0 \, 0 \, rz_{robot}^{camera}]$$

Thereby, only a positional error amount Δx in the x-axis, a positional error amount Δy in the y-axis, and a rotational error amount Δrz around the z-axis are obtained and a compensation amount for the error amounts is calculated in accordance with Equation 17 above. The automatic-operation control unit 47 compensates the image capturing pose of the robot 25 in the second image capturing process in accordance with Equation 18 above.

Second Calculation of Compensation Amounts

Subsequently, the compensation amount calculator 50" carries out the "preliminary processing", the "calculation of camera position in teaching", the "calculation of camera position in automatic operation", the "calculation of error amounts", and the "calculation of compensation amount" based on an image captured in the second image capturing process, thereby calculating positional error amounts in the x-axis, the y-axis, and the z-axis and rotational error amounts around the x-axis, the y-axis, and the z-axis and calculating compensation amounts for the calculated error amounts.

In this process, the "preliminary processing", the "calculation of camera position in teaching", the "calculation of camera position in automatic operation", the "calculation of error amounts", and the "calculation of compensation amount" are carried out with the camera position in teaching in the figure coordinate system and each camera position in each robot coordinate system as follows:

$$[x_{fig}^{camera} y_{fig}^{camera} z_{fig}^{camera} rx_{fig}^{camera} ry_{fig}^{camera} rz_{fig}^{camera}] = [x_{fig}^{camera} y_{fig}^{camera} z_{fig}^{camera} rx_{fig}^{camera} ry_{fig}^{camera} rz_{fig}^{camera}]$$

$$[x_{robot}^{camera} y_{robot}^{camera} z_{robot}^{camera} rx_{robot}^{camera} ry_{robot}^{camera} rz_{robot}^{camera}] = [x_{robot}^{camera} y_{robot}^{camera} z_{robot}^{camera} rx_{robot}^{camera} ry_{robot}^{camera} rz_{robot}^{camera}]$$

Thereby, a positional error amount $\Delta x$ in the x-axis, a positional error amount $\Delta y$ in the y-axis, a positional error amount $\Delta z$ in the z-axis, a rotational error amount $\Delta rx$ around the x-axis, a rotational error amount $\Delta ry$ around the y-axis, and a rotational error amount $\Delta rz$ around the z-axis are obtained and compensation amounts for the error amounts are calculated in accordance with Equation 17 above. The automatic-operation control unit 47 compensates the pose of the robot 25 in accordance with Equation 18 above. Note that the compensation amounts for the positional error amount $\Delta x$ in the x-axis, the positional error amount $\Delta y$ in the y-axis, and the rotational error amount $\Delta rz$ around the z-axis may maintain the values calculated in the first calculation or my replace the values calculated in the first calculation with the sum of values calculated in the first and second calculations.

The reason for this two-step calculation of compensation amounts is as follows: where the identification figure is positioned away from the center of the field of view of the camera 31 when an image of the identification figure is captured, there is a tendency that position data in the z-axis obtained from the figure coordinate system, rotation data around x-axis and y-axis vary widely and this tendency can deteriorate position accuracy in the x-axis and the y-axis.

Therefore, as described above, compensation amounts for positional error amounts $\Delta x$, $\Delta y$ in the x-axis and the y-axis and a rotational error amount $\Delta rz$ around the z-axis are calculated in the first calculation, and the image capturing pose of the robot 25 is compensated based on the calculated compensation amounts so that the identification image is positioned at the center of the field of view of the camera 31. Thereafter, based on an image captured with the identification figure positioned at the center of the field of view of the camera 31, compensation amounts for a positional error amount $\Delta z$ in the z-axis and rotational error amounts $\Delta rx$, $\Delta ry$ around the x-axis and the y-axis are calculated in the second compensation. This process enables the positional error amounts in the x-axis, the y-axis, and the z-axis and the rotational error amounts $\Delta rx$, $\Delta ry$, $\Delta rz$ around the x-axis, the y-axis, and the z-axis to be accurately calculated, and therefore enables the compensation amounts for the error amounts to be accurately calculated. Consequently, the pose of the robot 25 is controlled with high accuracy.

Fourth Embodiment

In the above-described embodiments, positional error amounts $\Delta x$, $\Delta y$ and a rotational error amount $\Delta rz$ are calculated to compensate the pose of the robot-mounted moving device. However, the present disclosure is not limited to this configuration. A configuration is possible in which a first identification position that is a reference position of the identification figure and a second identification position that is a position of the identification figure calculated from an image containing the identification figure captured by the camera for position recognition prior to the operation are used to obtain a target position that is a position of a target, e.g., a workpiece, and compensate the position of the hand unit of the robot. That is to say, a configuration is possible in which the target position is obtained directly without calculating positional error amounts $\Delta x$, $\Delta y$ and a rotational error amount $\Delta rz$.

Further, in the above-described embodiments are described mainly with respect to attachment and removal of a workpiece as an example. However, the present disclosure is not limited thereto. The target may be, besides a workpiece, a tool, an ATC camera, or a measuring device. The target should be understood as an object which is able to be attached in the machine tool for use. Such an object is able to be transferred by the robot-mounted moving device.

The robot-mounted moving device first memorizes, through teaching, a first identification position that is a position of the identification figure arranged within the machine tool on a first axis and a second axis that are set in a plane parallel to the identification figure (for example, position coordinates of the identification figure with respect to the two axes in the plane). The first identification position is information associated with a first device position that is a position of the robot-mounted moving device for performing an operation of removing a target, e.g., a workpiece, a tool, an ATC camera, or a measuring device, from the machine tool or an operation of attaching a target, e.g., a workpiece, a tool, an ATC camera, or a measuring device, into the machine tool. The first axis and the second axis need to intersect with each other but do not have to be orthogonal to each other. The first axis and the second axis have only to be able to provide information which enables recognition of a position (coordinates) in the plane. Of course, the orthogonal x-axis and y-axis are preferred. Note that the first device position of the robot-mounted moving position in this embodiment is positional information including positional change such as rotation.

The first identification position is associated with a target position that is a position of the target. The target position may be positional information on the position of the target itself, e.g., the position of a tool or the position of a workpiece, or may be positional information on an attachment position, e.g., a workpiece attachment position of a spindle to which the workpiece is attached or a tool attachment position of a spindle or tool rest to which the tool is attached, or positional information on a removal position.

For example, the robot-mounted moving device moves from the front of a second machine tool to the front of a first machine tool, into which a workpiece is to be attached, and stops there. The position at which the robot-mounted moving device stops is referred to as a second device position. If the second device position is identical to the first device position, it is possible to attach a workpiece without compensation. The robot-mounted moving device can move to and stops at a position different from the first device position. In such a case, the workpiece attachment position as viewed with respect to the second device position also differs from as viewed with respect to the first device position. Therefore, the position of the hand unit needs to be compensated.

Therefore, the robot-mounted moving device captures an image with the camera at the second device position. When the image captured with the camera of the robot-mounted moving device contains the identification figure, the robot-mounted moving device obtains a second identification position of the identification figure at the second device position. The robot-mounted moving device obtains information on the target position at the second device position based on the memorized first identification position and the second identification position obtained through the image capturing using the camera. Based on the obtained information on the target position, the robot-mounted moving device compensates the position of the hand unit of the robot by means of (a) movement on the first axis in a plane including the identification figure, (b) movement on the second axis in the plane, and (c) rotational movement in the plane, and attaches the workpiece gripped with the hand unit to a predetermined position within the machine tool.

For example. with the first and second axes respectively designated as X1-axis and Y1-axis with the origin at the first device position, the first identification position can be represented as (x1, y1, rz1). The first identification position is associated with the target position (x11, y11, rz11) that is the position of the target. With the first and second axes respectively designated as X2-axis and Y2-axis with the origin at the second device position, the second identification position can be represented as (x2, y2, rz2). If the second identification position is identical to the first identification position, (x2, y2, rz2) is identical to (x1, y1, rz1). Therefore, the target position as viewed with respect to the second device position is identical to positional information (x11, y11, rz11).

However, as described above, the robot-mounted moving position moves between machine tools, the second device position is sometimes different from the first device position. Here, a case where the first identification position is (x1, y1, 0 (rz1=0)) and the target position is (x11, y11, rz11) is described. In this case, with the first and second axes respectively designated as X2-axis and Y2-axis with the original at the second device position, the second identification position is not (x2, y2, rx2). This is because the first identification position and the second identification position are identical in the actual space but they are different in the position of the robot-mounted moving device (especially, the position of the moving part of the robot-mounted moving device). In particular, the orientation of the moving unit is different.

Therefore, in this embodiment, based on the relation between (i) the second identification position (x2, y2, rz2) with the first and second axes respectively designated as X2-axis and Y2-axis and (ii) the first identification position (x1, Y1, 0), the target position (x22, y22, rz22) that is the position of the target in the X2-Y2 coordinate system defined by the X2-axis and the Y2-axis is obtained in accordance with a matrix for transformation into positional information on the target position. The matrix for the transformation is prepared in advance and stored in the robot-mounted moving device. Based on the obtained positional information (x22, y22, rz22) on the target position on the X2- and Y2-axes, the control unit compensates the position of the hand unit of the robot by means of movement on the X2-axis in the plane, (b) movement on the Y2-axis in the plane, and rotational movement in the plane including the identification figure and controls the hand unit for change of a workpiece or a tool or the like.

In this embodiment, the matrix for transformation into positional information on the target position (x22, y22, rz22) is stored in advance into the robot-mounted moving device and the target position is obtained by the use of the matrix. However, the present disclosure is not limited to this configuration. For example, a table containing positional information on the position (x2, y2, rz2) of the identification figure obtained from the image captured with the camera and positional information on the target position (x22, y22, rz22) corresponding to the positional information (second identification position) may be stored in advance into the robot-mounted moving device.

Further, in this embodiment, the position of the hand unit is compensated without calculating the three error amounts, i.e., positional error amounts $\Delta x$, $\Delta y$ and a rotational error amount $\Delta rz$. However, a configuration is possible in which rotational error amounts $\Delta x$, $\Delta y$ are not calculated but a rotational error amount $\Delta rz$ is calculated. For example, an X coordinate (x22), a Y coordinate (y22) and a rotational error amount $\Delta rz$ of the target, i.e., a workpiece, at the second device position are calculated in accordance with a transformation matrix between the first identification position and the second identification position. By adding the rotational error mount $\Delta rz$ to the rotational position (rz11) of the target position at the first identification position, the target position (x22, y22, rz11+$\Delta rz$) can be obtained.

The positional information in this embodiment uses positional information consisting of three pieces of information, i.e., an x coordinate, a y coordinate, and a rotational coordinate (or amount of rotation). However, the present disclosure is not limited thereto. For example, 6 pieces of information (x, y, z, rx, ry, rz), i.e., three coordinates (x, y, z) and three rotational coordinates or amounts of rotation (rx, ry, rz), may be used. The number of pieces of information can be selected or adjusted as necessary. For example, a configuration is possible in which, as the target position, (i) positional information (x22, y22, z11, rx11, ry11, rz11+$\Delta rz$) or (ii) positional information (x22, y22, z11, 0, 0, rz11+$\Delta rz$) is output or obtained. In the case of the positional information (x22, y22, z11, 0, 0, rz11+$\Delta rz$), z11 is left because of the presence of the position on the z-axis. When the reference is set at 0, rx11 and ry11 are both 0 and they are not changed from 0 since there is no change in movement in the plane. Therefore, they can be set to 0. This positional information may be used but another configuration is possible in which information on 0 is removed and four pieces of information (x22, y22, x11, rz11+$\Delta rz$) are output or obtained as the target position.

Note that, although various variations have been described, the position of the hand unit in each variation is compensated in the plane (x, y, rz) including the identification figure, as described in the description of the above-described embodiments. Therefore, the common effect common to all embodiments and variations is that the compensation of the position of the hand unit is carried out with high accuracy in the plane including the identification figure.

Hereinbefore, embodiments of the present invention have been described. However, the present invention should not be construed as limited to the embodiments set forth herein and can be implemented in various manners.

For example, in the above-described embodiments, the identification figure has a matrix structure having a plurality of pixels arranged two-dimensionally. However, the identification figure is not limited to such a figure and may be any other suitable figure which allows for calculation of compensation amounts for the pose of the robot 25 based on a captured image of the figure.

Further, in the first embodiment, the system is configured to, with the first axis and the second axis in the plane including the identification figure respectively designated as x-axis and y-axis and the axis of rotation in the plane defined as z-axis, compensate the positional errors in the x-axis and the y-axis and the rotational error around the z-axis. However, the present invention is not limited to this configuration. Depending on the position of the identification figure, the compensation amount calculator 50 may designate the first axis or the second axis as z-axis. In such a case, the compensation amount calculator 50 may be configured to estimate a positional error amount in the z-axis and calculate a compensation amount for the positional error in the z-axis, and the automatic-operation control unit 47 may be configured to compensate the position of the robot 25 in the z-axis in each operating pose based on the calculated compensation amount in the z-axis. Note that the positional error amount in the z-axis may be calculated, for example, based on magnifications of the reference image and current image.

Further, in the above-described embodiments, an example configuration is described in which the automatic guided vehicle 35 is used. However, the present invention is not limited to such a configuration and the automatic guided vehicle 35 may be replaced with a transfer device which can be moved by a human operator pushing it, e.g., a generally used carriage. In such a case, a configuration is possible in which the robot 25 is mounted on the transfer device and the transfer device is transferred to the operating position set with respect to the machine tool 10 by human power to cause the robot 25 to carry out the attachment or removal of a workpiece to or from the machine tool 10.

Further, in the above-described embodiments, a vertical lathe as an example machine tool is described. However, the present invention is not limited to application to a vertical lathe and can be applied to any other known type of machine tool, such as a horizontal lathe, a vertical machining center, a horizontal machining center, or a combined machine tool including a tool spindle and a workpiece spindle.

Figure 10:
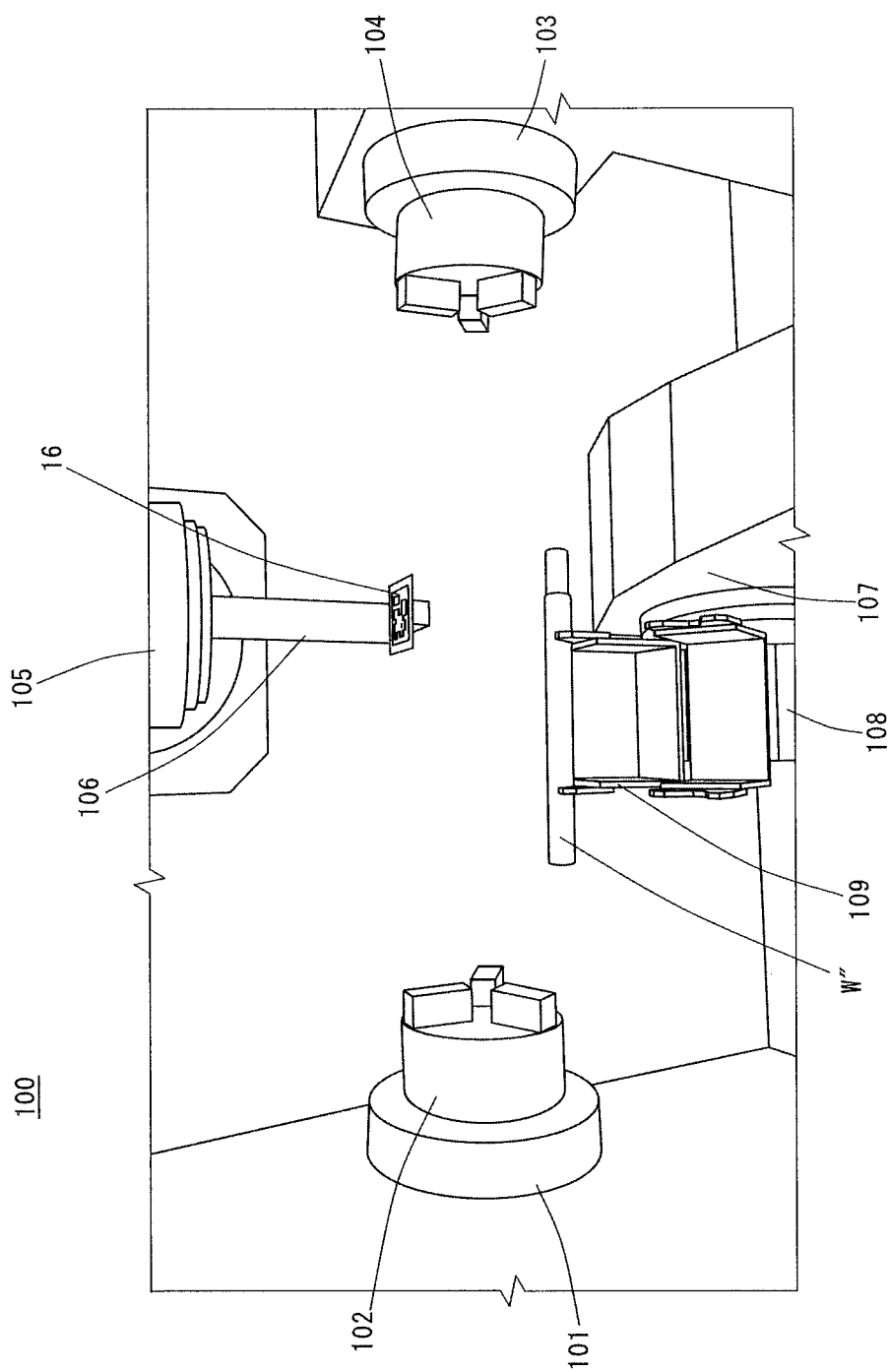
FIG. 10 is a diagram showing a variation of arrangement of the identification figure in the machine tool.

For example, in the case of a horizontal lathe 100 as shown in FIG. 10 that includes a tool spindle 105 rotating a tool, the lathe 100 can be configured such that the display board 16 is supported horizontally by a holder 106 and the holder 106 is attached to the tool spindle 105. In this case, the holder 106 is stored in a tool magazine as a tool storage while a machining operation is performed by the lathe 100, and the holder 106 is extracted from the tool magazine and attached to the tool spindle 105 when the robot 25 operates. Note that, in FIG. 10, reference numeral 101 denotes a first spindle, reference numeral 103 denotes a second spindle, and these spindles are arranged to be coaxial with each other and face each other. Further, reference numeral 102 denotes a first chuck attached to the first spindle 101 and reference numeral 104 denotes a second chuck attached to the second spindle 103. Further, reference numeral 107 denotes a tool rest, reference numeral 108 denotes a turret attached to the tool rest 107, reference numeral 109 denotes a support jig attached to an outer surface of the turret 108 to support a workpiece W'''.

Further, in the above-described embodiments, the robot coordinate systems are set such that the x-axis (x'-axis) and the y-axis (y'-axis) extend horizontally and the z-axis extends vertically. However, the present invention is not limited to such a configuration. The directions of the coordinate axes can be set freely. The same applies to the coordinate axes for the identification figure, i.e., the $x_r$-axis and the $y_r$ axis.

As already mentioned above, the above description of the embodiments is not limiting but illustrative in all aspects. One skilled in the art would be able to make variations and modifications as appropriate. The scope of the present invention is not defined by the above-described embodiments, but is defined by the appended claims. Further, the scope of the present invention encompasses all modifications made within the scope equivalent to the scope of the claims.

The invention claimed is:

1. A robot-mounted moving device movable around a machine tool,
   the robot-mounted moving device having stored therein a reference identification position as information associated with a reference device position,
   the reference device position being a position of the robot-mounted moving device for performing an operation of extracting a target from inside of the machine tool or an operation of attaching the target into the machine tool,
   the reference identification position being a position of an identification figure arranged within the machine tool on a first axis and a second axis set in a plane parallel to the identification figure at the reference device position, wherein the identification figure has a set position within the machine tool and the robot-mounted moving device moves relative to the identification figure,
   the robot-mounted moving device comprising:
   a robot having (i) a camera, (ii) a hand unit configured to grip a workpiece or a tool, (iii) a second arm unit to which the hand unit is movably coupled, and (iv) a first arm unit to which the second arm unit is movably coupled;
   a control unit controlling a position of the hand unit of the robot; and
   a moving unit configured to be movable and having the robot mounted thereon,
   wherein, at a current device position different from the reference device position, the control unit controls, based on a difference between the reference identification position and the current identification position which is a position of the identification figure in the plane when an image of the identification figure is captured by the camera at the current device position, movement of the hand unit of the robot to an operating pose by means of (a) movement on the first axis in the plane, (b) movement on the second axis in the plane, and (c) rotational movement in the plane.

2. A system comprising:
   a machine tool performing predetermined machining on a workpiece;
   a robot having a camera for image capturing and an end effector acting on the workpiece, and performing an operation to the machine tool;
   a transfer device having the robot mounted thereon, and configured to be movable to an operating position set with respect to the machine tool; and a controller configured to, in accordance with an operation program containing a predetermined operation command, bring the robot in sequence into an operation starting pose, an image capturing pose for causing the camera to face an identification figure for pose compensation arranged in the machine tool and capture an image of the identification figure, and one or more operating poses for causing the end effector to act on the workpiece, the operation starting pose, the image capturing pose, and the one or more operating poses being set in advance by performing a teaching operation to the robot, the identification figure being formed on a predetermined plane and arranged in a machining area of the machine tool, the controller being configured to:
in the teaching operation,
cause the camera to capture a reference image of the identification figure with the robot in the image capturing pose, and in actual operation of the robot in accordance with the operation program,
estimate, based on the reference image and a current image of the identification figure captured by the camera after the robot is brought into the image capturing pose from the operation starting pose when the transfer device is at the operating position, positional error amounts of the camera in a first axis and a second axis and a rotational error amount of the camera around a third axis between a current pose of the robot and a pose of the robot in the teaching operation, the first axis and the second axis being orthogonal to each other and set in a plane parallel to the identification figure, the third axis being orthogonal to the first axis and the second axis, calculate a compensation amount for the end effector in the one or more operating poses based on the estimated error amounts, and compensate a position of the end effector in each of the one or more operating poses based on the calculated compensation amount.

3. The system of claim 2, wherein:
the first axis and the second axis are respectively an x-axis and a y-axis of an x-axis and y-axis coordinate system corresponding to the pose of the robot in the teaching operation;

the third axis is a z-axis orthogonal to the x-axis and the y-axis; and the controller is configured to:
estimate positional error amounts $\Delta x$, $\Delta y$ of the camera in the x-axis and y-axis coordinate system and a rotational error amount $\Delta rz$ of the camera around the z-axis, calculate, based on the estimated positional error amounts $\Delta x$, $\Delta y$ and rotational error amount $\Delta rz$, translational error amounts $t_x$, $t_y$ of the end effector between a current position of the end effector and a position of the end effector in the teaching operation in the x-axis and y-axis coordinate system in accordance with an equation:

$$\begin{bmatrix} t_x \\ t_y \end{bmatrix} = \begin{bmatrix} x' \\ y' \end{bmatrix} - \begin{bmatrix} \cos\Delta rz & -\sin\Delta rz \\ \sin\Delta rz & \cos\Delta rz \end{bmatrix} \begin{bmatrix} x + \Delta x \\ y + \Delta y \end{bmatrix}$$

where x and y indicate a position of the camera in the teaching operation in the x-axis and y-axis coordinate system, and x' and y' indicate a current position of the camera in an x'-axis and y'-axis coordinate system corresponding to the current pose of the robot, and compensate a position of the end effector in each of the one or more operating poses based on the calculated translational error amounts $t_x$, $t_y$ and the rotational error amount $\Delta rz$.

4. The system of claim 2, wherein the transfer device is an automatic guided vehicle controlled by the controller and is configured to, under control by the controller, move to the operating position set with respect to the machine tool.

5. The system of claim 2, wherein the identification figure has a matrix structure having a plurality of pixels arranged two-dimensionally.

6. The system of claim 2, wherein the controller is configured to, after calculating the estimated positional error amounts of the camera in the first axis and the second axis and the estimated rotational error amount of the camera around the third axis, compensate the image capturing pose of the robot based on the estimated positional error amounts in the first axis and the second axis and the estimated rotational error amount around the third axis and bring the robot into the compensated image capturing pose, thereafter, cause the camera to capture the current an image of the identification figure, estimate, based on the current image of the identification figure and the reference image, a positional error amount of the camera in the third axis, a rotational error amount of the camera around the first axis, and a rotational error amount of the camera around the second axis between a current pose of the robot and a pose of the robot in the teaching operation, and compensate a position of the end effector in each of the one or more operating poses based on the estimated positional error amounts in the first axis, the second axis, and the third axis and the estimated rotational error amounts around the first axis, the second axis, and the third axis.

7. A system comprising:
a machine tool performing predetermined machining on a workpiece;

a robot having a camera for image capturing and an end effector acting on the workpiece, and performing an operation to the machine tool;

a transfer device having the robot mounted thereon, and configured to be movable to an operating position set with respect to the machine tool; and a controller configured to, in accordance with an operation program containing a predetermined operation command, bring the robot in sequence into an operation starting pose, an image capturing pose for causing the camera to capture an image of an identification figure for pose compensation arranged in the machine tool, and one or more operating poses for causing the end effector to act on the workpiece, the operation starting pose, the image capturing pose, and the one or more operating poses being set in advance by performing a teaching operation to the robot, the identification figure being formed on a predetermined plane and arranged in a machining area of the machine tool, the controller being configured to:
  in the teaching operation,
    cause the camera to capture a reference image of the identification figure with the robot in the image capturing pose, and
  in actual operation of the robot in accordance with the operation program,
    estimate, based on the reference image and a current an image of the identification figure captured by the camera after the robot is brought into the image capturing pose from the operation starting pose when the transfer device is at the operating position, positional error amounts of the camera in a first axis, a second axis, and a third axis and rotational error amounts of the camera around the first axis, the second axis, and the third axis between a current pose of the robot and a pose of the robot in the teaching operation, the first axis and the second axis being orthogonal to each other and set in a plane parallel to the identification figure, the third axis being orthogonal to the first axis and the second axis, and
    compensate a position of the end effector in each of the one or more operating poses based on the estimated positional error amounts and rotational error amounts.

8. The system of claim 7, wherein the controller is configured to carry out a process of calculating, based on the reference image, an image-capturing camera position $p_{ideal}^{camera\_teach}$ in the teaching operation in a teaching-operation robot coordinate system corresponding to the robot in the teaching operation, a process of calculating, based on the current image of the identification figure captured in the actual operation, an image-capturing camera position $P_{ideal}^{camera\_curr}$ in the actual operation in the teaching-operation robot coordinate system, a process of estimating, based on the calculated image-capturing camera position $p_{ideal}^{camera\_teach}$ ideal and image-capturing camera position $p_{ideal}^{camera\_curr}$ in the teaching-operation robot coordinate system, positional error amounts of the camera in the first axis, the second axis, and the third axis and rotational error amounts of the camera around the first axis, the second axis, and the third axis in an actual-operation robot coordinate system corresponding to the robot in the actual operation, and a process of compensating a position of the end effector in each of the one or more operation poses based on the estimated positional error amounts and rotational error amounts.

9. The system of claim 8, wherein the controller is configured to:
  after calculating the image-capturing camera position $p_{ideal}^{camera\_teach}$ ideal and the image-capturing camera position $p_{ideal}^{camera\_curr}$ in the teaching-operation robot coordinate system,
  carry out a process of calculating, based on teaching-operation camera angles $rx_{ideal}^{camera\_teach}$, $ry_{ideal}^{camera\_teach}$, $rz_{ideal}^{camera\_teach}$ in the teaching-operation coordinate system and current camera angles $rx_{ideal}^{camera\_curr}$ $ry_{ideal}^{camera\_curr}$, $rz_{ideal}^{camera\_curr}$ in the teaching-operation coordinate system, a difference between them to calculate, with the first axis, the second axis, and the third axis respectively designated as an x-axis, a y-axis, and a z-axis, rotational error amounts Δrx, Δry, and Δrz around the x-axis, the y-axis, and the z-axis and calculating, based on the calculated rotational error amounts Δrx, Δry, and Δrz, a rotation matrix $R_{curr}^{ideal}$ between the teaching-operation robot coordinate system and the actual-operation robot coordinate system as the rotational error amounts of the camera in the actual-operation robot coordinate system, a process of calculating a translation matrix $T_{curr}^{ideal}$ from the teaching-operation robot coordinate system to the actual-operation robot coordinate system as the positional error amounts of the camera in the actual-operation robot coordinate system, a process of calculating a compensation amount $M_{curr}^{ideal}$ based on the rotation matrix $R_{curr}^{ideal}$ and the translation matrix $T_{curr}^{ideal}$ curr, and a process of calculating a compensated position $p_{curr}^{goal}$ of the end effector in each of the one or more operating poses based on the compensation amount $M_{curr}^{ideal}$.

10. The system of claim 9, wherein the controller is configured to calculate the rotation matrix $R_{curr}^{ideal}$, the translation matrix $T_{curr}^{ideal}$, the compensation amount $M_{curr}^{ideal}$, and the compensated position $p_{curr}^{goal}$ in accordance with equations below:

$$R_{curr}^{ideal} = \begin{bmatrix} \cos\Delta rz & -\sin\Delta rz & 0 \\ \sin\Delta rz & \cos\Delta rz & 0 \\ 0 & 0 & 1 \end{bmatrix} \begin{bmatrix} \cos\Delta ry & 0 & \sin\Delta ry \\ 0 & 1 & 0 \\ -\sin\Delta ry & 0 & \cos\Delta ry \end{bmatrix}$$

$$\begin{bmatrix} 1 & 0 & 0 \\ 0 & \cos\Delta rx & -\sin\Delta rx \\ 0 & \sin\Delta rx & \cos\Delta rx \end{bmatrix}$$

$$T_{curr}^{ideal} = P_{curr}^{camera\_curr} - R_{curr}^{ideal} \cdot P_{ideal}^{camera\_curr}$$

$$M_{curr}^{ideal} = \begin{bmatrix} R_{curr}^{ideal} & T_{curr}^{ideal} \\ 0 & 1 \end{bmatrix}$$

$$\begin{bmatrix} P_{curr}^{goal} \\ 1 \end{bmatrix} = M_{curr}^{ideal} \cdot \begin{bmatrix} P_{ideal}^{goal} \\ 1 \end{bmatrix}$$

where $p_{goal}^{ideal}$ is a position of the end effector in the teaching operation in the teaching-operation robot coordinate system.

11. A machine tool for machining a workpiece, configured such that:
  a transfer device has a robot mounted thereon and is configured to transfer the robot to a first position to allow the robot to hold the workpiece, the robot having a camera for capturing a current image including an identification figure arranged in the machine tool, and an end effector acting on the workpiece;
  the camera captures a current image including the identification figure arranged in the machine tool after the transfer device transfers the robot to the first position;
  a second position of the end effector in an X-axis and a Y-axis in a three-dimensional space defined by the X-axis, the Y-axis, and a Z-axis is compensated by linearly and rotationally moving the end effector based on positional information of the identification figure in the current image of the identification figure and a reference image of the identification figure; and
  the end effector is caused to act on the workpiece in the machine tool after the second position is compensated, wherein the identification figure is arranged at a set position in a machining area of the machine tool.

* * * * *